April 20, 1965 F. H. McRITCHIE 3,178,935
PRESSURE MEASURING DEVICE
Filed March 20, 1963

INVENTOR.
FRANK H. McRITCHIE

United States Patent Office 3,178,935
Patented Apr. 20, 1965

3,178,935
PRESSURE MEASURING DEVICE
Frank H. McRitchie, Pittsburgh, Pa., assignor to The Refractories Institute, Pittsburgh, Pa., a corporation of Pennsylvania
Filed Mar. 20, 1963, Ser. No. 266,543
3 Claims. (Cl. 73—94)

This invention relates to an apparatus for pressure measurement especially adapted for measurement of the maximum mechanical pressure applied to a particulate composition within a confined chamber. The pressure measurement depends upon the observed deformation of a calibrated plate.

The invention is especially useful in measuring pressures which are developed within brick molds and similar molding apparatus wherein particulate compositions are compressed.

The present invention comprises a combination of elements including an outer ring, a base plate having three protuberances, and a calibrated plate which bears against the three protuberances. The protuberances, when pressure loads are applied to the device, will penetrate the surface of the calibrated plate in accordance with the applied pressure.

The principal objects of the invention include:

To provide an inexpensive measuring device for determining the maximum mechanical pressure applied to a particulate composition within an enclosed chamber;

To provide an accurate measuring device requiring no extension of wires or other connecting means externally of the chamber;

To provide a measuring device which occupies only a negligible volume of a typical brick-mold apparatus;

To provide a pressure measuring device which possesses a high degree of accuracy and precision in pressure measurements;

To provide a pressure measuring device, the presence of which in a chamber does not affect the accuracy of the measurements which are taken within the chamber or interfere with the phenomena occurring therein;

To provide an apparatus for measuring pressures within a chamber which is substantially entirely filled with a particulate composition.

These and other objects and advantages of the present invention will be apparent from the following detailed description by reference to the accompanying drawings in which.

*The environment*

Figure 1:
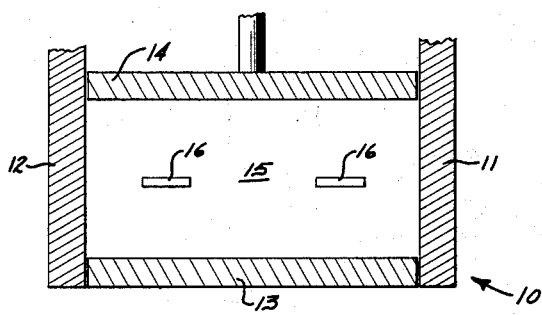
FIGURE 1 is a cross-section view through a typical power press brick mold apparatus showing two of the present measuring devices within a brick-making composition.
Figure 3:
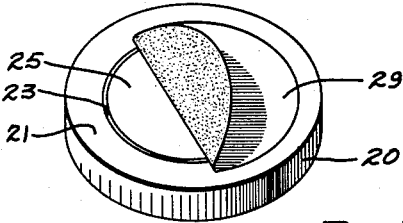
FIGURE 3 is a perspective illustration of the present measuring device assembled with an adhesive cover member partly lifted away.
Figure 2:
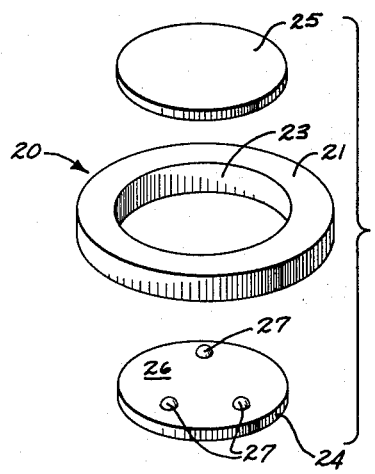
FIGURE 2 is an exploded perspective illustration of the present measuring device.

Referring to FIGURE 1, there is illustrated in cross-section a brick press 10 having vertical side walls 11, 12 and a bottom wall 13. A descending press-plate 14 is positioned between the vertical walls 11, 12. An interior chamber 15 is defined by the walls 11, 12, 13 and the press-plate 14. Typically the chamber 15 is loosely filled with a particulate brick-making composition. The descent of the press-plate 14 compacts the composition within the chamber 15 and creates a compacted raw brick which is subsequently removed from the chamber 15 and fired for hardening.

It is desirable in studying the brick-forming operations to determine actual mechanical pressures which are manifested within the chamber 15. Variations of the actual pressures over the surface will result in non-uniform bricks possibly having a tendency to crumble along the edges. The technique of feeding the loose compositions into the open chamber 15 may have some bearing on the pressure distributions which result. Frequently additives are included in brick-making compositions to improve the flow-properties of the materials. An accurate determination of the developed pressures within the chamber aids in evaluating the effectiveness of such additives.

*The present invention*

According to this invention, relatively tiny pressure measuring devices can be positioned within the particulate composition within the chamber 15. The present measuring devices occupy only a negligible portion of the total volume of the chamber 15 as indicated by the numeral 16 in FIGURE 1. Since only a negligible fraction of the total volume of the chamber is occupied by the measuring devices 16, their interference with the phenomena otherwise occurring within the chamber 15 is likewise negligible.

The present measuring devices have the overall appearance of thin disks or wafers and are of especial value in measuring the pressure applied between the descending press-plate 14 and the bottom wall 13. The vertical pressure in general will differ from the concurrently existing pressure between the side walls 11, 12 since particulate compositions do not possess the hydraulic property of uniform pressure development in all directions.

The present measuring device is illustrated in FIGURES 2, 3, 4 and 5. A circular ring 20 is provided with a flat top surface 21 and a flat bottom surface 22. It should be understood that the terms "top" and "bottom" are used in reference to the illustrations in FIGURES 2, 3, 4 and 5 and that the device will perform equally satisfactorily upside-down from the illustrated presentation. The ring 20 has a machined bore 23. The periphery of the ring 20 is preferably circular to minimize the total volume of the device.

Loosely fitted within the bore 23 are a base plate 24 and a calibrated plate 25. The base plate 24 is essentially a thin disk having a flat inner surface 26 to which three protuberances 27 are adhered. The protuberances 27 preferably comprise hardened metal elements having a flat surface adhered to the surface 26 and also having an exposed spherical surface. Ideally the protuberances consist of hemi-spheres which have been cut or abraded from bearing balls. By the term "hemi-sphere," a precise half of a sphere is not intended, but merely any spherical segment is contemplated.

Figure 4:
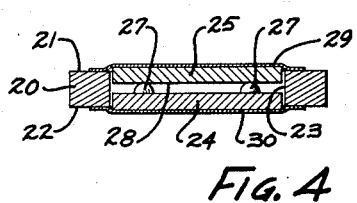
FIGURE 4 is a cross-section view through an assembled measuring device of this invention.
Figure 5:
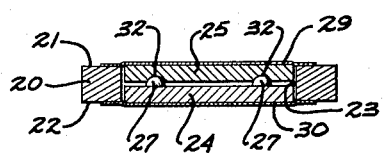
FIGURE 5 is a cross-section view, similar to that of FIGURE 4, through an assembled measuring device during the application of a pressure load to the device.

The calibrated plate 25 is a thin disk having a flat interior surface 28 which is preferably highly polished. The flat surface 28 rests in point-contact with the three protuberances 27 as is clearly shown in FIGURE 4. The distance between the exterior (or non-opposed) surfaces of the base plate 24 and the calibrated plate 25, as seen in FIGURE 4, is slightly greater than the thickness of the ring 20, i.e., thicker by approximately the depth of indentations which are anticipated in the calibrated plate 25. Pliable cover members 29, 30 are adhered to the measuring devices to cover the exterior flat surfaces of the base plate 24 and the calibrated plate 25 thereby preventing ingress of any particles into the bore 23. The cover members preferably are wider than the bore 23 and less wide than the periphery of the ring 20. The cover members are preferably formed from thin films such as paper, plastic films and the like and are coated on one surface with a pressure-sensitive adhesive coating. The cover members provide a convenient surface for writing identifying data, such as test numbers, on each pressure measuring device.

Operation

Figure 6:
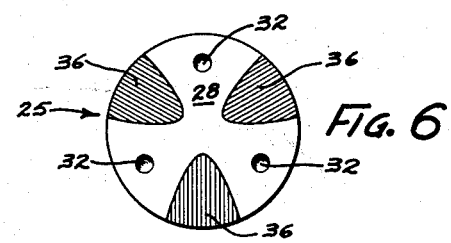
FIGURE 6 is a plan view of a calibrated plate showing a set of three indentations resulting from application of a previous load and also showing the availability of the calibrated plate for a subsequent measurement.

As mechanical pressure is applied to the measuring device 16, the load is borne between the base plate 24 and the calibrated plate 25 through the protuberances 27. The protuberances 27 (also known as penetrators) create indentations 32 in the calibrated plate 25 much in the manner of the well-known Rockwell Hardness Tester. After the mechanical pressure is released, the contents of the chamber 15 are removed and the individual measuring devices 16 are recovered for dismantling and inspection. The identations 32 are seen in FIGURE 6. By measuring the diameter (or depth) of the indentations 32 with a suitably calibrated microscope, the amount of force required to create such indentations can be determined. The total force required to create all three of the indentations 32 is cumulated and is considered to have been acting over an area of the calibrated plate 25. Thus the total pressure can be determined by dividing the known cross-sectional area of the calibrated plate 25 into the measured total force.

Calibration

The calibrated plate 25 is "calibrated" in the sense that it is usually a hardened tool steel disk which has been subjected to a precise heat treatment and subsequently calibrated. The calibration consists of determining the indentation diameter which will result from a known load application with spherical surfaces corresponding to the hardened protuberances.

The thickness of the calibrated plate 25 preferably is about ten times the depth of any anticipated indentations which will develop in the calibrated plate in order to maintain a constant relation between indentation depth and applied load over the entire measuring range of the pressure measuring device.

The base plate may be thinner than the calibrated plate, and, in order to keep the device as thin as feasible, the base plate may be fabricated from different and harder materials than the calibrated plate to achieve the desired thinness.

Typically where a brick press is considered, pressures of the order of about 10,000 p.s.i. are anticipated. The present device presents reproducible pressure determinations over the range from about 1,000 to about 25,000 p.s.i. where the calibrated plate is fabricated from tool steel having a hardness in the range from about Rockwell–B–10 through Rockwell–C–50.

In general tool steel is a preferred material for the calibrated plate. Bronze and aluminum alloys also might be used provided the material do not possess large crystals. Pure aluminum, for example, possesses large crystals which actually interfere with the accuracy of measuring the diameters of the indentations in the calibrated plate.

Figures 7, 8:
FIGURE 7 is a perspective illustration of a cone having a flat base which may be utilized as a penetrator or protuberance.
FIGURE 8 is a perspective illustration of a pyramid having a flat base which may be used as a penetrator or protuberance.

The protuberances 27 are preferably spherical surface elements, although pointed cones or pyramids with flat bases may also be used. See the cone 27a of FIGURE 7 and the pyramid 27b of FIGURE 8. Where spherical elements are utilized, the diameters ranging from about 0.01-inch to about 0.25-inch are feasible. Excellent results have been achieved with spherical elements having diameters of $1/16$-inch and $1/8$-inch. The protuberances could be spheres which are adhered to the base plate.

The protuberances are maintained in a triangular array. Preferably the protuberances serve as the corners of an equilateral triangle having its center substantially coincident with the center of the base plate. The protuberances should be placed sufficiently inside the rim of the base plate so that there will be no edge effects when the protuberances engage the corresponding calibrated plate. Ideally the point contact should occur at least 2.5 times the anticipated depression diameter from the rim of the calibrated plate.

Figure 9:
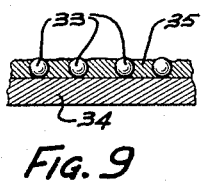
FIGURES 9 and 10 are cross-section illustrations of a plate having spherical elements adhered thereto (FIGURE 9) prior to grinding and (FIGURE 10) after grinding of the spherical elements.
Figure 10:
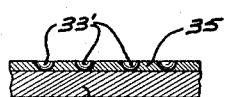

The spherical-surfaced elements may be formed as shown in FIGURES 9 and 10 by encapsulating a number of bearing balls 33 on a flat plate 34 in a suitable resin 35. The bearing balls 33 and resin 35 are abraded away against a grinding wheel to produce the hemi-spherical elements 33' shown in FIGURE 10. The nearly hemi-spherical elements 33' are recovered from the resin 35 and are measured. Three of the hemi-spherical elements 33' having approximate identical heights are selected for each set of protuberances and are adhered to a base plate 24 by means of a suitable adhesive such as an epoxy resin.

Re-use of calibrated plates

The calibrated plate 25 of FIGURE 6 has a set of indentations 32 resulting from a load test. The shaded areas 36 are spaced apart adequately for receiving indentations from a later test. The subsequent indentations should preferably be centered between the existing indentations 32. Each calibrated plate 25 thus can be used twice. The adhesive cover members 29, 30 maintain alignment of the base plate 24 and calibrated plate 25 thereby assuring that the second measurement indentations will occur where desired. The base plate 24 along with protuberances 27 can be re-used time after time along with the ring 20.

A typical measuring device according to this invention has a ring 0.75-inch in diameter with a 0.5-inch bore. The thickness of the ring is 0.125-inch. The protuberances are nearly hemi-spherical units ground from $1/16$-inch diameter bearing balls.

I claim:
1. A disk-like pressure measuring device adapted for total introduction into a chamber comprising:
   a ring having an outer circumference and an inner bore;
   a base plate comprising a flat disk having three protuberances secured to an inner flat surface thereof in a triangular array;
   a calibrated plate comprising a flat disk having a polished interior surface;
   the said polished surface of the said calibrated plate being in point-contact with each of the said three protuberances;
   the said base plate and the said calibrated plate being peripherally aligned and being disposed within the said bore with the space between said plates being confined by said ring;
   means for securing the said plates within the said bore, whereby mechanical pressures applied across the said device cause the protruberances to create indenta- tions in the said calibrated plate corresponding in diameter to the maximum applied pressure.

2. The pressure measuring device of claim 1 wherein the said means for securing the said plates comprises a cover member formed from a thin film having a pressure-sensitive adhesive surface on one side, the said cover member being substantially circular and having a diameter greater than the said bore.

3. The pressure measuring device of claim 1 wherein the thickness between the outer surfaces of the two said plates is greater than the thickness of the said ring before the said protuberances have penetrated the said calibrated plate.

References Cited by the Examiner

UNITED STATES PATENTS

| 2,155,635 | 4/39  | Bennett      | 73—300  |
| 2,370,784 | 3/45  | Edwards      | 73—85 X |
| 2,454,793 | 11/48 | Grogan et al.| 73—489  |
| 2,583,004 | 1/52  | McCorkle     | 73—35   |

FOREIGN PATENTS 515,140  2/38  Great Britain.

RICHARD C. QUEISSER, *Primary Examiner.*

JOSEPH P. STRIZAK, *Examiner.*